US012693888B2

(12) United States Patent  
Bregman et al.

(10) Patent No.: US 12,693,888 B2  
(45) Date of Patent: Jul. 28, 2026

(54) MANAGING DATA ACCESS BY COMMUNICATION PROTOCOLS IN CONTINUOUS INTEGRATION ENVIRONMENTS

(71) Applicant: RED HAT, INC., Raleigh, NC (US)

(72) Inventors: Arie Bregman, Gan Yavne (IL); Avraham Talmor, Rishon Letzion (IL); Ilan Gersht, Bat Yam (IL)

(73) Assignee: Red Hat, Inc., Raleigh, NC (US)

( * ) Notice: Subject to any disclaimer, the term of this patent is extended or adjusted under 35 U.S.C. 154(b) by 1171 days.

(21) Appl. No.: 17/536,494

(22) Filed: Nov. 29, 2021

(65) Prior Publication Data

US 2023/0168918 A1 Jun. 1, 2023

(51) Int. Cl.
| | |
|---|---|
| *G06F 9/46* | (2006.01) |
| *G06F 8/61* | (2018.01) |
| *G06F 9/48* | (2006.01) |

(52) U.S. Cl.
CPC ................ *G06F 9/468* (2013.01); *G06F 8/62* (2013.01); *G06F 9/4843* (2013.01)

(58) Field of Classification Search
CPC .......... G06F 9/468; G06F 8/62; G06F 9/4843; G06F 21/6218; G06F 21/604; G06F 2221/2141
See application file for complete search history.

(56) References Cited

U.S. PATENT DOCUMENTS

| | | | |
|---|---|---|---|
| 10,033,833 B2 | 7/2018 | Fu et al. |
| 10,452,435 B2 | 10/2019 | Novak et al. |
| 10,728,364 B1 | 7/2020 | Licata et al. |
| 10,853,059 B2 | 12/2020 | Mills |

(Continued)

FOREIGN PATENT DOCUMENTS

CN 112711411 A 4/2021

OTHER PUBLICATIONS

Rangnau et al., "Continuous Security Testing: A Case Study on Integrating Dynamic Security Testing Tools in CT/CD Pipelines", University of Groningen, TNO, 11 pages https://www.researchgate. net/profile/Fatih-Turkmen-2/publication/346379276_Continuous_ Security_Testing_A_Case_Study_on_Integrating_Dynamic_Security_ Testing_Tools_in_CICD_Pipelines/links/6024f235a6fdcc37a81a92be/ Continuous-Security%20Security%20Testing%20A,per%20day.

(Continued)

*Primary Examiner* — Dong U Kim  
(74) *Attorney, Agent, or Firm* — Womble Bond Dickinson (US) LLP

(57) ABSTRACT

The technology disclosed herein enables managing data access by communication protocols in continuous integration environments. An example method comprises scheduling, by a processor, a software build job to execute on a computing node of a computer system; identifying a first list specifying a first set of access privileges by the software job to a first set of communication protocols, wherein the first list is exclusively associated with the software build job; identifying a second list comprising a second set of access privileges to a second set of communication protocols, wherein the second list is specific to the computer system; and responsive to determining that the access privileges of the first list do not conflict with the access privileges of the second list, causing a filtering agent operating on the computing node to enforce the access privileges of the first list and the access privileges of the second list.

17 Claims, 6 Drawing Sheets

(56) References Cited

U.S. PATENT DOCUMENTS

| | | | |
|---|---|---|---|
| 2005/0086536 A1* | 4/2005 | Wu | G06F 21/604 |
| | | | 726/4 |
| 2010/0313189 A1* | 12/2010 | Beretta | G06F 21/44 |
| | | | 717/148 |
| 2013/0074066 A1* | 3/2013 | Sanzgiri | H04L 41/0895 |
| | | | 718/1 |
| 2016/0092672 A1* | 3/2016 | Li | G06F 21/51 |
| | | | 726/22 |
| 2019/0075124 A1* | 3/2019 | Kimhi | G06F 8/62 |
| 2021/0064354 A1 | 3/2021 | Atkinson et al. | |

OTHER PUBLICATIONS

Github, Inc., "Demo Rule CI/CD Pipeline", 2021, 3 pages https://github.com/InRule/DemoRuleCICDPipeline.

* cited by examiner

COMPUTER SYSTEM
<u>200</u>

ACCESS MANAGER
<u>127</u>

RULES MODULE
<u>212</u>

SYSTEM-BASED
ACCESS MODULE
<u>214</u>

PIPELINE-BASED
ACCESS MODULE
<u>216</u>

CONFLICTS MANAGER
<u>218</u>

COMPUTING NODE
<u>222A</u>

FILTERING
AGENT
<u>224A</u>

COMPUTING NODE
<u>222B</u>

FILTERING
AGENT
<u>224B</u>

COMPUTING NODE
<u>222C</u>

FILTERING
AGENT
<u>224C</u>

MEMORY
<u>230</u>

RULES DATA STRUCTURE
<u>232</u>

300

Schedule a software build job to execute on a computing node of a computer system
310

Identify a first list specifying a first set of access privileges by the software job to a first set of communication protocols, wherein the first list is exclusively associated with the software build job
320

Identify a second list comprising a second set of access privileges to a second set of communication protocols, wherein the second list is specific to the computer system
330

Responsive to determining that the access privileges of the first list do not conflict with the access privileges of the second list, cause a filtering agent operating on the computing node to enforce the access privileges of the first list and the access privileges of the second list
440

FIG. 3

PROCESSING DEVICE

RULES MODULE
410

SYSTEM-BASED
ACCESS
MODULE
420

PIPELINE-BASED
ACCESS
MODULE
430

CONFLICTS
MANAGER
440

MEMORY
450

DATA

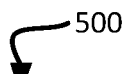

500

Scheduling a software build job to execute on a computing node of a computer system
510

Identifying a first list specifying a first set of access privileges by the software job to a first set of communication protocols, wherein the first list is exclusively associated with the software build job
520

Identifying a second list comprising a second set of access privileges to a second set of communication protocols, wherein the second list is specific to the computer system
530

Responsive to determining that the access privileges of the first list do not conflict with the access privileges of the second list, causing a filtering agent operating on the computing node to enforce the access privileges of the first list and the access privileges of the second list
540

FIG. 5

MANAGING DATA ACCESS BY COMMUNICATION PROTOCOLS IN CONTINUOUS INTEGRATION ENVIRONMENTS

TECHNICAL FIELD

The present disclosure is generally related to build management, and more particularly, to managing data access by communication protocols in continuous integration environments.

BACKGROUND

In computer program development, continuous integration is the practice of merging developer working copies of computer program code for an application into a shared mainline code base, generally, several times a day. With continuous integration, each computer program developer team member submits source code for the application being developed on a daily (or more frequent) basis, and a set of operations referred to herein as a build process ("build") is performed to produce executable code from the source code. The executable code may be for an application, for example. The set of operations for providing a build may include compiling source code files to produce the executable code for an application, performing tests on the executable code, and instating or deploying the executable code. The build process may be performed periodically, or with each significant source code change. Isolated source code changes can be tested as part of the build process when the source code is added to the larger mainline code base.

BRIEF DESCRIPTION OF THE DRAWINGS

The present disclosure is illustrated by way of examples, and not by way of limitation, and may be more fully understood with references to the following detailed description when considered in connection with the figures, in which:

FIG. 3 depicts a flow diagram of an example method for managing data access via communication protocols, in accordance with one or more aspects of the present disclosure;

FIG. 5 depicts a flow diagram of another example method for managing data access via communication protocols, in accordance with one or more aspects of the present disclosure.

Figure 1:
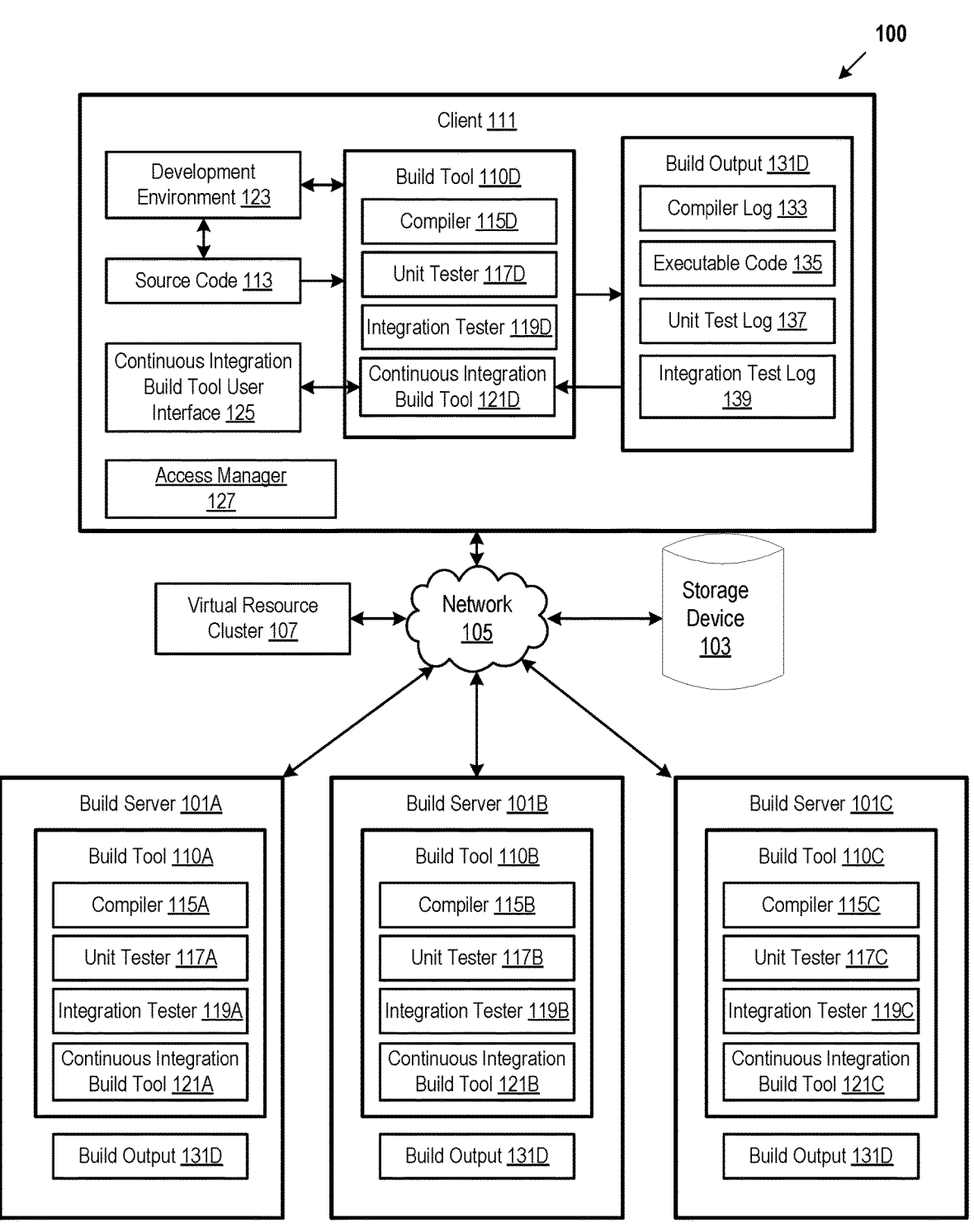
FIG. 1 depicts a high-level block diagram of an example computing environment that includes a provisioning component that schedules jobs for execution on provisioned computing nodes, in accordance with one or more aspects of the present disclosure.

Described herein are systems and methods for managing data access by communication protocols in continuous integration environments. Continuous software integration tools, referred to herein as "build tools," may perform build processes to generate software images from source code and other data. Software images may be, for example, executable code of software application programs. Source code may include instructions in a programming language that may be translated to executable code. The translation from source code to executable code may be performed by compiler programs. Other data may also be processed, e.g., transformed to suitable formats, and included in software images. A build process may cause the appropriate source code to be translated to executable code and included in the resulting software images. Instructions specifying how to perform the build process may be provided to the build tools in the form of build files, such as build scripts or declarative descriptions of the files to be built in terms of files from which they are built. A particular set of instructions specifying how to perform a particular build process are referred to herein as a software build "job." A job may be executed, e.g., by a build tool running on a computing node, and the executing job is referred to herein as an "active build." A computing node may be a virtualized or bare metal computer system (e.g., a server) that provides computing resources to execute jobs. A job may include a set of stages, which are may be executed sequentially in an active build. A job may thus be referred to as a "pipeline" of one or more stages. The stages may include, for example, compile, test, and deploy stages. The compile stage may translate source code to executable code, the test stage may perform tests to verify that the executable code operates correctly, and the deploy stage may install the executable code on host machines, for example. A build may execute for a substantial period of time (e.g., several minutes to several hours or days).

Computing nodes may be selected from a pool of available computing nodes and each computing node may include a different set of computing resources. Computing resources may include central processing unit(s) (CPU(s)), memory (e.g., volatile memory such as random access memory (RAM)), non-volatile memory, network bandwidth, etc. A scheduled job may be placed in a first-in, first-out (FIFO) build queue and the next available computing node from the node pool may be assigned to execute the next waiting job.

Current systems fail to provide features for regulating data traffic in active builds. In particular, current systems are unable to restrict an active build from accessing data via certain communication protocols. A communication protocol may include any network protocol, such as Internet Protocol (IP), Transmission Control Protocol (TCP), User Datagram Protocol (UDP), Hypertext Transfer Protocol (HTTP), File Transfer Protocol (FTP), Secure Shell (SSH), etc. Failure to prevent data access via certain communication protocols (e.g., FTP) can lead to security and reliability issues due to the defects and faults of said communication protocols. This may lead to delays in job execution, and poor utilization of computing resources. Accordingly, it is desirable to provide the ability to manage communication protocols used by active builds.

Aspects of the present disclosure address the above-noted and other deficiencies by enhancing a build system with the ability to manage data access by certain communication protocols for a job executing on a computing node. In an illustrative example, an access manager may enable a client device to set rules regarding data access via one or more communication protocols. The rules may include a system-based access list and/or a pipeline-based access list. The system-based access list may identify which communication protocols are allowed and/or restricted for all jobs executing on the build system. The pipeline-based access list may identify which communication protocols are allowed and/or restricted for specific jobs (or specific groups of jobs) executing on the build system. In some embodiments, the access lists may include an inclusion list indicating which communication protocols are allowed to be used by a job(s) (e.g., Allow: SSH), and/or an exclusion list indicating which communication protocols are restricted from being used by a job(s) (e.g., Deny: FTP).

The access manager may restrict communications via one or more communication protocols for all jobs (via the system-based access list) executing on the computing nodes of the build system or for specific jobs (via the pipeline-based access list) executing on one or more computing nodes of the build system. In particular, the access manager may install a filtering agent (e.g., a device driver) on the operating system of the computing node executing a job. The filtering agent may monitor communication requests by the job executing on the computing node. For example, the filtering agent may listen for commands issued and/or received, by the computing node, using a particular communication protocol (e.g., HTTP, FTP, SSH, etc.). Responsive to determining that the job issued a command using a communication protocol, the filtering agent may determine whether the communication protocol of the issued command is allowed to be used by the job by, for example, determining whether the communication protocol matches a communication protocol on the system-based access list or the pipeline-based access list. Responsive to the communication protocol of the issued command being on an access inclusion list, the filtering agent may allow the command to issue. Responsive to the communication protocol of the issued command not being on the access inclusion list (or being on an access exclusion list), the filtering agent may deny or block the command from processing (e.g., silently drop the network packets and optionally return an error code to the client device).

In some embodiments, the access manager may resolve conflicting rules between the system-based access list and the pipeline-based access list (e.g., one access list allows a particular communication protocol while the other list restricts the particular communication protocol). Conflicting rules may include contrary access privileges for a particular communication protocol listed on two separate access lists. In an example, responsive to a job being scheduled for execution on a computing node, the access manager may query the build system for the system-based access list and the pipeline-based access list associated with the job. The access manager may then aggregate the rules on both access lists into a single combined list. In the event that two rules conflict (e.g., the system-based access list indicates that FTP is restricted while the pipeline-based access list indicated that FTP is allowed), the access manager may select the rule from the access list with a higher priority (e.g., the system-based access list) and disregard the rule on the other access list (e.g., the pipeline-based access list). The combined list may then be used by the filtering agent on the computing node scheduled to execute the job. Accordingly, aspects of the present disclosure improve the security, reliability and resource utilization of build systems, as well as prevent delays in job execution.

Various aspects of the above referenced methods and systems are described in details herein below by way of examples, rather than by way of limitation.

FIG. 1 depicts a high-level block diagram of an example computing environment 100 that includes an access manager 127, in accordance with one or more aspects of the present disclosure. The computing environment 100 may provide build management services that include executing build operations to perform builds of source code 113 to produce build output 131A-D. The builds may be performed in accordance with instructions provided by the continuous integration build tool user interface 125. The computing environment 100 may include build servers 101A-C for running the sets of operations for providing builds in a continuous integration environment. The builds may be for source code 113, e.g., of an application that is being developed. An application may be, for example, a web application, a desktop application, a browser application, etc. An application may be a messaging application, a video application, a social networking application, video sharing application, photo sharing application, chat application, mobile application of a content provider or any combination of such applications. An application may be a computationally large or data-intensive application, such as a forecasting application, a modeling application, a data analysis application, etc. The build servers 101A-C may be hosted on any type of computing node, which may be a virtualized or bare metal computing device such as a server computer, a desktop computer, a portable computing device such as, and not limited to, netbooks, laptop computers, and the like.

Build tools 110A-D may be located on client 111, on build servers 101A-C, or both. Each build tool 110A-D may execute a set of operations to provide the build of the mainline code. The mainline code may be the base of a project on which development progresses. The set of operations may include compiling the code, testing the code when the code is compiled, testing isolated code when the code is added to the larger mainline code base, and performing continuous build operations e.g., performing a build a periodic intervals or in response to user requests, and presenting information about the status of executing builds and the results of completed builds. A software build job (e.g., a pipeline of one or more stages) can be executed by build tool 110A-D. Client 111 may further include access manager 127 to manage access, by build tool 110A-110D, to network resources. Access manager 127 will be explained in greater detail with references to FIG. 2 below.

Users, such as computer program development team members, may use a development environment 123 to submit source code 113 to the build tool 110D located on client 111 and/or to one or more build tools 110A-C located on build servers 101A-C. Users may submit source code to build tools 110A-C located on the build servers 101A-C from client 111 via network 105. Build tool 110A-D or other tool (e.g., a version control tool) may merge the submitted source code 113 with a shared mainline code base that is being stored and maintained by build server 101A-C. Users may submit source code 113 to any of the build tools 110A-D on a daily (or more frequent) basis, and request execution of a build process for the submission.

A client machine 111 may be a computing device such as a server computer, a desktop computer, a set-top box, a gaming console, a television, a portable computing device such as, and not limited to, mobile telephones, personal digital assistants (PDAs), portable media players, netbooks, laptop computers, an electronic book reader and the like. The network 105 may be a private network (e.g., a local area network (LAN), a wide area network (WAN), intranet, or other similar private networks) or a public network (e.g., the Internet).

Storage device 103 may be physical memory and may include volatile memory devices (e.g., random access memory (RAM)), non-volatile memory devices (e.g., flash memory, NVRAM), and/or other types of memory devices. In another example, storage device 103 may include one or more mass storage devices, such as hard drives, solid state drives (SSD)), other data storage devices, or a combination thereof. In yet another example, storage device 103 may be any virtual memory, logical memory, other portion of memory, or a combination thereof for storing, organizing, or accessing data. In a further example, storage device 103 may include a combination of one or more memory devices, one or more mass storage devices, virtual memory, other data storage devices, or a combination thereof, which may or may not be arranged in a cache hierarchy with multiple levels.

Build tool 110A-D may include a compiler 115A-D to compile computer source code 113 into executable code 135, and to generate other build output 131A-D, such as a compiler log 133 that contains output describing progress and results of the compilation process. Build tool 110A-D may include a unit tester 117A-D and an integration tester 119A-D for running automated tests on artifacts (e.g., tangible by-products produced during software development). Unit tester 117A-D may test that the individual functions in the source code 113 or executable code 135 work properly and generate unit test log 137 that contains output(s) describing progress and results of the unit tester 117A-D. Integration tester 119A-D may test the executable code 135 in an environment in which the executable code 135 is expected to be executed by users. Build tool 110A-D may include continuous integration build tool 121A-D for performing continuous build operations (e.g., performing a build at periodic intervals or in response to user requests), and presenting information about the status of executing builds and the results of completed builds. Continuous integration build tool 121A-D may start a build, e.g., by executing compiler 115A-D, unit tester 117A-D, and integration tester 119A-D in accordance with a build configuration script that contains instructions for compiling the source code and testing the resulting executable code 135. Continuous integration build tool 121A-D may monitor build output 131A-D and display progress information, such as the stage of the build (e.g., compiling, unit testing, or integration testing), the status of an executing build (e.g., how many files have been compiled, how many tests have passed, and how many tests have failed). Continuous integration build tool 121A-D may detect the completion of a build by receiving a result value from compiler 115A-D, unit tester 117A-D, and integration tester 119A-D, or by detecting particular text in the build output logs, for example. Continuous integration build tool 121A-D may generate an integration test log 139 containing information describing the progress of the operations performed by the continuous integration build tool 121A-D.

Integration tester 119A-D may create virtual resource cluster 107 for the integration testing of the artifacts. The virtual resources in cluster 107 may be containers, virtual machines, container(s) within a virtual machine, and/or virtual machine(s) running within a container. A container may refer to an isolated set of resources allocated to executing an application and/or process independent from other applications and/or processes. A virtual machine may be an emulated computer system, created using software, which includes its own operating system (referred to as a guest operating system) and executes application programs. A host machine may host one or more virtual resources for virtualizing one or more application servers for executing the artifacts for the application for the integration testing.

In one example, the host machine for virtual resource cluster 107 may be the same computing machine that hosts build server 101A-C and/or client 111. In another example, virtual resource cluster 107 may include one or more other computing machines not shown by FIG. 1. The computing machines may be server computer systems, desktop computers or any other computing devices.

A host machine may allocate a certain amount of its computing resources (e.g., processor resources (CPU resources), physical or virtual memory, input/output (I/O) resources, network resources, etc.) to individual virtual resources (e.g., a virtual machine, container), and may multiplex the underlying hardware platform (e.g., infrastructure) of the host machine among the virtual resources on the host machine. For a virtual machine, the layer providing the virtualization is commonly referred to as a hypervisor and is also known as a virtual machine monitor (VMM), a kernel-based hypervisor, or part of a host operating system. The hypervisor may emulate the underlying hardware (e.g., infrastructure) of the host machine, making use of the virtual machine. Accordingly, each build tool 110A-D (or build server 101A-C and/or client 111) may be allotted a different set of computing resources. By way of illustrative example only, build tool 110A may be allotted two 2.4 megahertz (MHz) processors, and 2 gigabytes (GB) of RAM memory, build tool 110B may be allotted four 3.2 MHz processors and 16 GB of RAM memory, etc.

An application being deployed in the container may run under the host operating system. The host machine for the container may include a container engine to create and manage the containers. In one implementation, a container may run on a virtual machine to provide an extra layer of separation between applications running on a guest operating system of the virtual machine. In one implementation a virtual machine may run on a container to maintain isolation and security properties of virtual machines while being able to package and distribute computer programs as a container.

Integration tester 119A-D may run the executable code 135 in virtual resource cluster 107, and run integration tests against the distributed system being provided by virtual resource cluster 107. After build tool 110A-D compiles the source code 113 and runs unit tests and integration tests, build tool 110A-D may report whether the attempt to provide the build was a success or includes a failure. A failure may be caused by the compiling of the source code failing, unit testing failing, and/or integration testing failing.

Continuous integration build tool user interface 125 may enable a user to start one or more active build jobs. Continuous integration build tool user interface 125 presents an active build list, a build queue list, and a jobs list. The jobs list includes one or more job representations, which are user-interface representations of jobs that build tool 110A-D can execute to perform builds. Instructions can be provided to build tools 110A-D in the form of build files, such as build scripts or declarative descriptions of the files to be built in terms of files from which they are built. A job can be executed by build tool 110A-D. A job can include a set of stages, which may be executed sequentially. The stages can include, for example, compile, test, and deploy stages. The compile stage may translate source code to executable code, the test stage may perform tests to verify that the executable code operates correctly, and the deploy stage may install the executable code on host machines or nodes.

Figure 2:
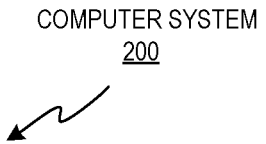
FIG. 2 depicts a block diagram illustrating components and modules of an example computer system, in accordance with one or more aspects of the present disclosure.

FIG. 2 is a block diagram illustrating example components and modules of computer system 200, in accordance with one or more aspects of the present disclosure. In the example shown, computer system 200 may include access manager 127, computing nodes 222A-222C, and memory 230. Access manager 127 may run executable code that implements one or more of the components and modules and may be implemented within a host operating system, a hypervisor, a guest operating system, a container, hardware firmware, or a combination thereof. Access manager 127 may include rules module 212, system-based access module 214, pipeline-based access module 216, and conflicts module 218. Computing node 222A-C may be a virtualized or bare metal computing device such as a server computer, a desktop computer, a portable computing device, etc. Memory 230 may include rules data structure 232.

Rules module 212 may enable a client (e.g., client 111) to set rules regarding data access by one or more communication protocols for a job. In particular, rules module 212 may enable the client to regulate, for each job via communication protocols, data access to an external entity (e.g., any network address, a client, a server, or any computer system that is not part of computer system 200). A communication protocol may include Internet Protocol (IP), Transmission Control Protocol (TCP), User Datagram Protocol (UDP), Hypertext Transfer Protocol (HTTP), File Transfer Protocol (FTP), Secure Shell (SSH), or any other communication protocol used to transfer data between computing node 222A-222C executing and the external entity.

In some embodiments, the rules may include a system-based access list that indicates which communication protocols are allowed and/or restricted for all jobs executing on system 200 (e.g., executing on computing nodes 222A-222C). In particular, the system-based access list may include which communication protocols each job executing on computer system 200 may use (e.g., a inclusion list) and/or communication protocols each job executing on computer system 200 is restricted from using (e.g., an exclusion list) to communicate with external entities. The system-based access list may be generated via input from the client. The system-based access list may be maintained by rules module 212 and stored on rules data structure 232. The rules data structure may include a listing of one or more communication protocols and an indicator reflecting the access privileges of each listed communication protocol, or reflecting the access privileges of all of the listed communication protocols. For example, in some embodiments, instead of a using an exclusion list or inclusion list, the system-based access list may include, for each communication protocol, an indicator indicative of whether jobs executing on computer system 200 are granted access to use the communication protocol and/or restricted from accessing data via the communication protocol. In some embodiments, the indicator may be metadata maintained in rules data structure 232. For example, the rules data structure may include a listing one or more communication protocols where each communication protocol is associated with an access privilege.

In an example, rules module 212 can display, on client 111 via user interface 125, a list of communication protocols. Responsive to user input (e.g., user selection), rules module 212 may add one or more of the communication protocols to one or more system-based access lists (e.g., the inclusion list, the exclusion list) or set permissions (e.g., using the metadata data maintained in data structure 232) of one or more of the communication protocols. In other embodiments, rules module 212 may prompt for user input regarding which communication protocols to allow and/or restrict (e.g., Allow: SSH, Deny: FTP, etc.) for all jobs executing on computer system 200.

In some embodiments, the system-based access list (and the pipeline-based access list, which is explained in detail below) may include access permissions to specific network entities (e.g., hosts or endpoints). In particular, the system-based access list may include an inclusion list or an exclusion list for one or more specific entities. For example, the system-based access list may list which communication protocols jobs are allowed to use to communicate with a specific server (e.g., SSH allow: server.x.com, server.y.com) and/or which communication protocols jobs are restricted from using to communicate with a specific server (e.g., FTP deny: server.c.com, server.c.com).

In some embodiments, the rules may include a pipeline-based access list that indicates which communication protocols are allowed or restricted for a particular job (or a group of jobs) executing on system 200 (e.g., executing on computing nodes 222A-222C). Similar to the system-based access list, the pipeline-based access list may include which communication protocols a job executing on computer system 200 may access (e.g., a inclusion list) and/or which communication protocols each job executing on computer system 200 is restricted from accessing (e.g., an exclusion list). The pipeline-based access list may be generated via input from the client, may be maintained by rules module 212, and may be stored on rules data structure 232. In some embodiments, instead of a using an exclusion list or inclusion list, the system-based access list may include, for each communication protocol, an indicator indicative whether a particular job executing on computer system 200 is granted access to the communication protocol and/or restricted from accessing data via the communication protocol. In some embodiments, the indicator may be metadata maintained in rules data structure 232.

As discussed above, a pipeline-based access list may indicate which communication protocols are allowed or restricted for a group of jobs executing on computing node 222A-222C. In some embodiments, jobs may be grouped based on a regular expression (regex), an identifier, or any other attribute. Accordingly, the rules of the pipeline-based access list may be applied to all jobs that include a particular attribute. For example, the pipeline-based access list may be applied, by pipeline-based access module 216, to all job that include "Production-Upgrade" in their title.

In an example, for a particular job, rules module 212 can display, on client 111 via user interface 125, a list of communication protocols. Responsive to user input (e.g., user selection), rules module 212 may add one or more of the communication protocols to one or more the pipeline-based access lists (e.g., the inclusion list, the exclusion list) associated with the particular job, or set permissions of one or more of the communication protocols for the particular job. In other embodiments, rules module 212 may prompt for user input regarding which communication protocols to allow and/or restrict (e.g., Allow: HTTP, Deny: UDP, etc.) for the particular job.

System-based access module 214 may restrict communication (e.g., network traffic) via one or more communication protocols for all jobs executing on the computing nodes of system 200 (e.g., computing nodes 222A-222C). In particular, system-based access module 214 may utilize filtering agent 224A-224C on the operating system of each computing node 222A-222C. Filtering agent 224A-224C may include the system-based access list, or may communicate with the rules module 212 and/or memory 230 to access the system-based access list. The features provided by filtering agent 224A-224C may be integrated into the operations performed by operating system of computing node 222A-222C. The filtering agent may be installed using, for example, a configuration file, an executable file, etc. A configuration file may be any software used to configure the parameters and/or settings of a computer program. Filtering agent 224A-224C may monitor communication requests by a job executing on computing node 222A-222C. In some embodiments, filtering agent 224A-224C may listen for commands issued and/or received, by computing node 222A-222C, using a particular communication protocol (e.g., HTTP, FTP, SSH, etc.). In an example, filtering agent 224A-224C may monitor for the commands using a filter, a packet sniffer, a resource monitoring tool, etc. In another embodiment, filtering agent 224A-224C may read executing code to determine whether the executing code issues a command using a communication protocol. Responsive to determining that the job issued a command using a communication protocol, filtering agent 224A-224C may determine whether the communication protocol of the issued command is allowed to be used by the job. For example, filtering agent 224A-224C can determine whether the communication protocol matches a communication protocol on the system-based access list. In particular, for embodiments where the system-based access list being a inclusion list, filtering agent 224A-224C may determine whether communication protocol of the issued command is listed on the system-based access inclusion list. Responsive to communication protocol of the issued command being on the system-based access inclusion list, filtering agent 224A-224C may allow the command to issue, or do nothing to impede the command. Responsive to communication protocol of the issued command not being on the system-based access inclusion list (or being on an exclusion list), filtering agent 224A-224C may deny or block the command from processing (e.g., silently drop the network packets and optionally return an error code to the client device).

Similarly, pipeline-based access module 216 may restrict communications via one or more network protocols for a particular computing job (or group of jobs) of system 200. In particular, system-based access module 214 may install filtering agent 224A-224C (or any other capable software) on the operating system of the computing node assigned to process a job associated with a pipeline-based access list. Filtering agent 224A-224C may include the pipeline-based access list, or may communicate with the rules module 212 and/or memory 230 to access the pipeline-based access list. Filtering agent 224A-224C may then monitor communication requests by the job executing on the assigned computing node 222A-222C. Filtering agent 224A-224C may listen to for commands issued and/or received, by the assigned computing node 222A-222C, using a particular communication protocol (e.g., HTTP, FTP, SSH, etc.). Responsive to determining that the job issued a command using the communication protocol, filtering agent 224A-224C may allow or deny the command based on the access privileges (e.g., allow communication protocol, deny communication protocol, etc.) provided by the pipeline-based access list.

In some embodiments, system-based access module 214 and/or pipeline-based access module 216 may uninstall filtering agent 224A-224C upon the completion of a job. For example, responsive to computing node 222A-222C completing the execution of a job, the system-based access module 214 and/or pipeline-based access module 216 may uninstall filtering agent 224A-224C. By uninstalling filtering agent 224A-224C, the system-based access module 214 and/or pipeline-based access module 216 may update the access lists or prevent an outdated access lists from conflicting with a new job scheduled for execution on computing node 222A-222C.

Conflict manager 218 may resolve conflicts between the system-based access list and the pipeline-based access list. In some embodiments, responsive to a job being assigned to or scheduled for execution on a computing node, conflicts manager 218 may query rules module 212 for a system-based access list and a pipeline-based access list associated with the job. Conflicts manager 218 may then aggregate the rules on both access lists into a single combined list. In the event that two rules conflict (e.g., the system-based access list indicates that FTP is restricted while the pipeline-based access list indicated that FTP is allowed), conflicts manager 218 may select the rule from the access list with a higher priority. The priority of each access list may be indicated (e.g., via metadata) in rules data structure 232 and may be predetermined or set via input from client 111. The priority may be high priority (e.g., prioritize rules of the access list above other access lists) low priority (prioritize other access lists above the low priority access list), a hierarchy of priority indicators (e.g., a first access list has a highest priority of 2, a second access list has a lower priority of 1, etc.), etc. To determine whether two rules conflict, conflicts manager 218 may, based on the query, determine that each access list include the same communication protocol, and compare the access privileges, on each list, for the communications protocol. Responsive to determining that the access privileges are contrary (e.g., one access list allows the communication protocol while the other list denies the communication protocol), the conflicts manager may then determine the priority of each access list using, for example, rules data structure 232. Conflicts manager 218 may then select the rule (e.g., access privileges for a particular communication protocol) with the higher priority, and disregard all other rules. For example, responsive to the system-based access list having a higher priority than the pipeline-based access list, conflicts manager 218 may list, on the combined access list, the rule from the system-based access list (e.g., FTP is restricted) and disregard the rule on the pipeline-based access list (e.g., FTP is allowed). Conflicts manager 218 may then provide the combined list to system-based access module 214 and/or pipeline-based access module 216 for use by filtering agent 224A-224C on the computing node scheduled to execute the job.

FIG. 3 depicts a flow diagram of an example method 300 for managing data access by communication protocols, in accordance with one or more aspects of the present disclosure. Method 300 and each of its individual functions, routines, subroutines, or operations may be performed by one or more processors of the computer device executing the method. In certain implementations, method 300 may be performed by a single processing thread. Alternatively, method 300 may be performed by two or more processing threads, each thread executing one or more individual functions, routines, subroutines, or operations of the method. In an illustrative example, the processing threads implementing method 300 may be synchronized (e.g., using semaphores, critical sections, and/or other thread synchronization mechanisms). Alternatively, the processes implementing method 300 may be executed asynchronously with respect to each other.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 400 may be performed by an executable code of a host machine (e.g., host operating system or firmware), a virtual machine (e.g., guest operating system or virtual firmware), an external device (e.g., a PCI device), other executable code, or a combination thereof.

Method 300 may be performed by processing devices of a server device or a client device and may begin at block 310. At block 310, the client device may schedule a software build job to execute on a computing node of a computer system. For example, the processing device may select a job from a job queue based on a selection criterion (e.g., first-in, first-out (FIFO), based on client device input, etc.).

At operation 320, the client device may identify a first list specifying a first set of access privileges by the software job to a first set of communication protocols. The first list may be exclusively associated with the software build job. In some embodiments, the first list is a pipeline-based access list. The first list may be identified using at least one of a regular expression, an identifier, or an attribute associated with the software build job. For example, the client device may determine that the job title include "Production-Upgrade," and identify an access list associated with jobs that include the attribute "Production-Upgrade." The first list may specify one or more communication protocols the software build job is prohibited from using or allowed to use. The communication protocol may include at least one of an Internet Protocol (IP), a Transmission Control Protocol (TCP), a User Datagram Protocol (UDP), a Hypertext Transfer Protocol (HTTP), a File Transfer Protocol (FTP), or a Secure Shell (SSH).

At operation 330, the client device may identify a second list comprising a second set of access privileges to a second set of communication protocols. The second list may be specific to the computer system. For example, the second list may be the system-based access list.

At operation 340, the client device may, responsive to determining that the access privileges of the first list do not conflict with the access privileges of the second list, cause a filtering agent operating on the computing node to enforce the access privileges of the first list and the access privileges of the second list. In some embodiments, responsive to determining that the access privileges of the first list conflict with the access privileges of the second list, the client device may generate a third list based on a priority of at least one of the first list or the second list. For example, the third list may be a combined access list. Responsive to the execution of the software build job, the client device may uninstall the filtering agent from the computing node. Responsive to completing the operations described herein above with references to block 340, the method may terminate.

Figure 4:
FIG. 4 depicts a block diagram of a computer system operating in accordance with one or more aspects of the present disclosure.

FIG. 4 depicts a block diagram of a computer system 400 operating in accordance with one or more aspects of the present disclosure. One or more of the components of FIG. 1 may execute on computer system 400. Computer system 400 may be the same or similar to client 111 or build server 101A-D of FIG. 1, and may include one or more processors and one or more memory devices. In the example shown, computer system 400 may include rules module 410, system-based access module 420, pipeline-based access module 430, conflicts manger 440, memory 450.

Computer system 400 may schedule a software build job to execute on a computing node of a computer system. For example, the processing device may select a job from a job queue based on a selection criterion (e.g., first-in, first-out (FIFO), based on client device input, etc.).

Pipeline-based access module 430 may identify a first list specifying a first set of access privileges by the software job to a first set of communication protocols. The first list may be exclusively associated with the software build job. In some embodiments, the first list may be a pipeline-based access list generated by rules module 410 and stored in memory 450. The first list may be identified using at least one of a regular expression, an identifier, or an attribute associated with the software build job. For example, the processing device may determine that the job title include "Production-Upgrade," and identify an access list associated with jobs that include the attribute "Production-Upgrade." The first list may specify one or more communication protocols the software build job is prohibited from using or allowed to use. The communication protocol may include at least one of an Internet Protocol (IP), a Transmission Control Protocol (TCP), a User Datagram Protocol (UDP), a Hypertext Transfer Protocol (HTTP), a File Transfer Protocol (FTP), or a Secure Shell (SSH).

System-based access module 420 may identify a second list comprising a second set of access privileges to a second set of communication protocols. The second list may be specific to the computer system. For example, the second list may be a system-based access list generated by rules module 410 and stored in memory 450.

Conflicts module 440 may determine whether a conflict between the first list and the second list exists. Responsive to determining that the access privileges of the first list do not conflict with the access privileges of the second list, system 400 may cause a filtering agent operating on the computing node to enforce the access privileges of the first list and the access privileges of the second list. Responsive to determining that the access privileges of the first list conflict with the access privileges of the second list, system 400 may generate a third list based on a priority of at least one of the first list or the second list. For example, the third list may be a combined access list. Responsive to the execution of the software build job, the system 400 may uninstall the filtering agent from the computing node.

FIG. 5 depicts a flow diagram of one illustrative example of a method 500 for managing data access by communication protocols, in accordance with one or more aspects of the present disclosure. Method 500 may be similar to method 300 and may be performed in the same or a similar manner as described above in regards to method 500. Method 500 may be performed by processing devices of a server device or a client device and may begin at block 510.

At block 510, a processing device may schedule a software build job to execute on a computing node of a computer system. For example, the processing device may select a job from a job queue based on a selection criterion (e.g., first-in, first-out (FIFO), based on client device input, etc.).

At operation 520, the processing device may identify a first list specifying a first set of access privileges by the software job to a first set of communication protocols. The first list may be exclusively associated with the software build job. In some embodiments, the first list is a pipeline-based access list. The first list may be identified using at least one of a regular expression, an identifier, or an attribute associated with the software build job. For example, the processing device may determine that the job title include "Production-Upgrade," and identify an access list associated with jobs that include the attribute "Production-Upgrade." The first list may specify one or more communication protocols the software build job is prohibited from using or allowed to use. The communication protocol may include at least one of an Internet Protocol (IP), a Transmission Control Protocol (TCP), a User Datagram Protocol (UDP), a Hypertext Transfer Protocol (HTTP), a File Transfer Protocol (FTP), or a Secure Shell (SSH).

At operation 530, the processing device may identify a second list comprising a second set of access privileges to a second set of communication protocols. The second list may be specific to the computer system. For example, the second list may be the system-based access list.

At operation 540, the processing device may, responsive to determining that the access privileges of the first list do not conflict with the access privileges of the second list, cause a filtering agent operating on the computing node to enforce the access privileges of the first list and the access privileges of the second list. In some embodiments, responsive to determining that the access privileges of the first list conflict with the access privileges of the second list, the processing device may generate a third list based on a priority of at least one of the first list or the second list. For example, the third list may be a combined access list. Responsive to the execution of the software build job, the processing device may uninstall the filtering agent from the computing node. Responsive to completing the operations described herein above with references to block 540, the method may terminate.

Figure 6:
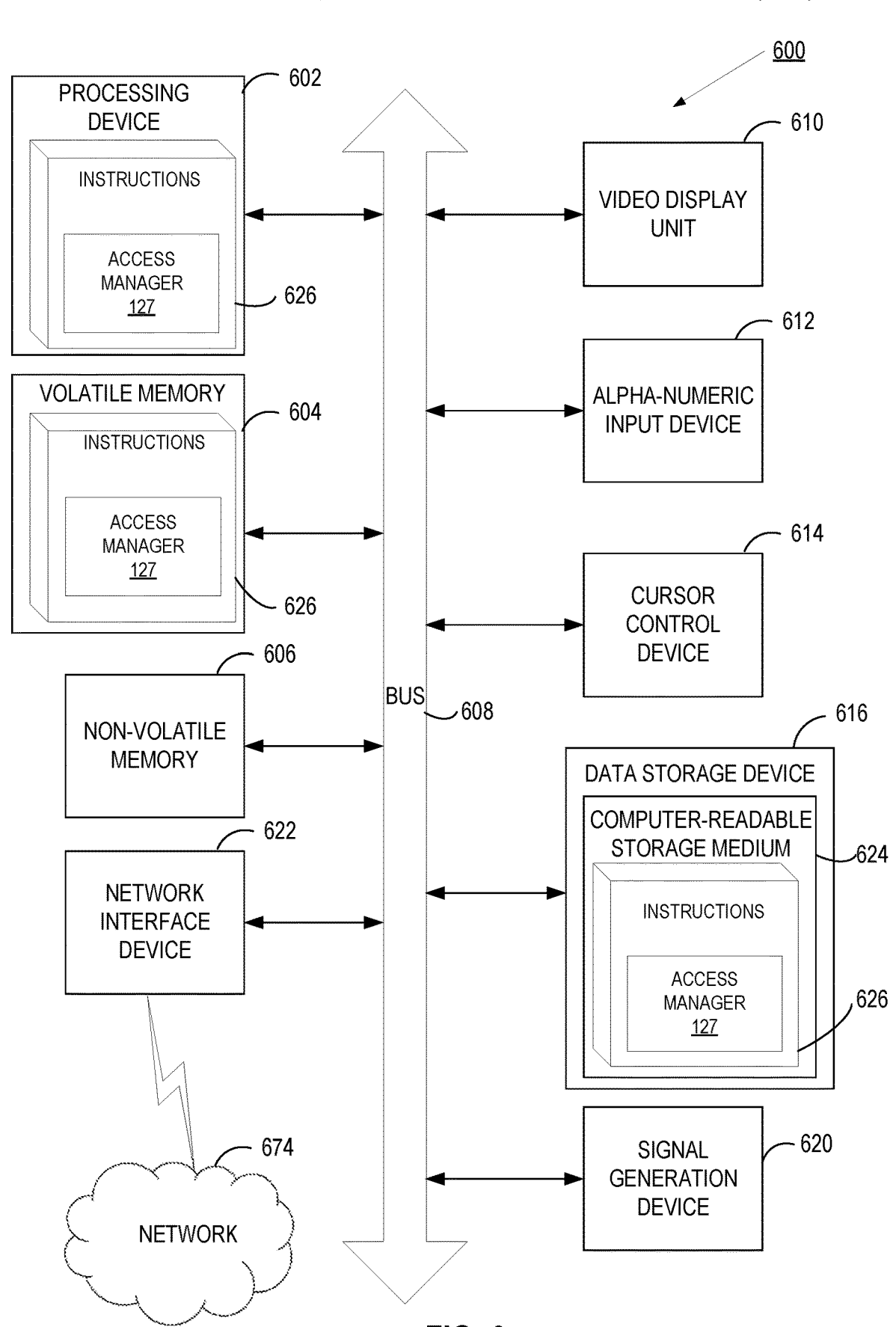
FIG. 6 depicts a block diagram of an example computer system operating in accordance with one or more aspects of the present disclosure.

FIG. 6 depicts a block diagram of a computer system operating in accordance with one or more aspects of the present disclosure. In various illustrative examples, computer system 600 may correspond to computing environment 100 of FIG. 1. Computer system 600 may be included within a data center that supports virtualization. Virtualization within a data center results in a physical system being virtualized using virtual machines to consolidate the data center infrastructure and increase operational efficiencies. A virtual machine (VM) may be a program-based emulation of computer hardware. For example, the VM may operate based on computer architecture and functions of computer hardware resources associated with hard disks or other such memory. The VM may emulate a physical environment, but requests for a hard disk or memory may be managed by a virtualization layer of a computing device to translate these requests to the underlying physical computing hardware resources. This type of virtualization results in multiple VMs sharing physical resources.

In certain implementations, computer system 600 may be connected (e.g., via a network, such as a Local Area Network (LAN), an intranet, an extranet, or the Internet) to other computer systems. Computer system 600 may operate in the capacity of a server or a client computer in a client-server environment, or as a peer computer in a peer-to-peer or distributed network environment. Computer system 600 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 600 may include a processing device 602, a volatile memory 604 (e.g., random access memory (RAM)), a non-volatile memory 606 (e.g., read-only memory (ROM) or electrically-erasable programmable ROM (EEPROM)), and a data storage device 616, which may communicate with each other via a bus 608.

Processing device 602 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 600 may further include a network interface device 622. Computer system 600 also may include a video display unit 610 (e.g., an LCD), an alphanumeric input device 612 (e.g., a keyboard), a cursor control device 614 (e.g., a mouse), and a signal generation device 620.

Data storage device 616 may include a non-transitory computer-readable storage medium 624 on which may store instructions 626 encoding any one or more of the methods or functions described herein, including instructions for implementing methods 300 and 500.

Instructions 626 may also reside, completely or partially, within volatile memory 604 and/or within processing device 602 during execution thereof by computer system 600, hence, volatile memory 604 and processing device 602 may also constitute machine-readable storage media.

While computer-readable storage medium 624 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

Other computer system designs and configurations may also be suitable to implement the system and methods described herein. The following examples illustrate various implementations in accordance with one or more aspects of the present disclosure.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "determining," "deriving," "encrypting," "creating," "generating," "using," "accessing," "executing," "obtaining," "storing," "transmitting," "providing," "establishing," "receiving," "identifying," "initiating," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods 400 and 600 and/or each of its individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method comprising:
   scheduling, by a processing device, a software build job to execute on a computing node of a computer system;
   identifying a first list specifying a first set of access privileges by the software build job to a first set of communication protocols, wherein the first list is exclusively associated with the software build job;
   identifying a second list comprising a second set of access privileges to a second set of communication protocols, wherein the second list is specific to the computer system;
   responsive to determining that the access privileges of the first list do not conflict with the access privileges of the second list, causing, by the processing device, a filtering agent operating on the computing node to enforce the access privileges of the first list and the access privileges of the second list; and
   uninstalling the filtering agent from the computing node upon completion of the software build job, wherein the access privileges of the first list and the second list are updated based on the uninstalling the filtering agent and prevent a conflict between a subsequent build job and the access privileges of the first list and the second list.

2. The method of claim 1, further comprising:
   responsive to determining that the access privileges of the first list conflict with the access privileges of the second list, generating a third list based on a priority of at least one of the first list or the second list.

3. The method of claim 1, wherein the first list is identified using at least one of a regular expression, an identifier, or an attribute associated with the software build job.

4. The method of claim 1, wherein the first list specifies one or more communication protocols the software build job is prohibited from using.

5. The method of claim 1, wherein the first list comprises one or more communication protocols the software build job is allowed to use.

6. The method of claim 1, wherein the communication protocol comprises at least one of an Internet Protocol (IP), a Transmission Control Protocol (TCP), a User Datagram Protocol (UDP), a Hypertext Transfer Protocol (HTTP), a File Transfer Protocol (FTP), or a Secure Shell (SSH).

7. A system comprising:
   a memory;
   a processing device operatively coupled to the memory, the processing device configured to:
   schedule, by the processing device, a software build job to execute on a computing node of a computer system;
   identify a first list specifying a first set of access privileges by the software build job to a first set of communication protocols, wherein the first list is exclusively associated with the software build job;
   identify a second list comprising a second set of access privileges to a second set of communication protocols, wherein the second list is specific to the computer system;
   responsive to determining that the access privileges of the first list do not conflict with the access privileges of the second list, cause, by the processing device, a filtering agent operating on the computing node to enforce the access privileges of the first list and the access privileges of the second list; and
   uninstall the filtering agent from the computing node upon completion of the software build job, wherein the access privileges of the first list and the second list are updated based on the uninstall the filtering agent and prevent a conflict between a subsequent build job and the access privileges of the first list and the second list.

8. The system of claim 7, wherein the processing device is further configured to:
   responsive to determining that the access privileges of the first list conflict with the access privileges of the second list, generate a third list based on a priority of at least one of the first list or the second list.

9. The system of claim 7, wherein the first list is identified using at least one of a regular expression, an identifier, or an attribute associated with the software build job.

10. The system of claim 7, wherein the first list specifies one or more communication protocols the software build job is prohibited from using.

11. The system of claim 7, wherein the first list comprises one or more communication protocols the software build job is allowed to use.

12. The system of claim 7, wherein the communication protocol comprises at least one of an Internet Protocol (IP), a Transmission Control Protocol (TCP), a User Datagram Protocol (UDP), a Hypertext Transfer Protocol (HTTP), a File Transfer Protocol (FTP), or a Secure Shell (SSH).

13. A non-transitory machine-readable storage medium storing executable instructions that, when executed by a processing device, cause the processing device to:
   schedule, by the processing device, a software build job to execute on a computing node of a computer system;
   identify a first list specifying a first set of access privileges by the software build job to a first set of communication protocols, wherein the first list is exclusively associated with the software build job;

identify a second list comprising a second set of access privileges to a second set of communication protocols, wherein the second list is specific to the computer system;

responsive to determining that the access privileges of the first list do not conflict with the access privileges of the second list, cause a filtering agent operating on the computing node to enforce the access privileges of the first list and the access privileges of the second list; and uninstall the filtering agent from the computing node upon completion of the software build job, wherein the access privileges of the first list and the second list are updated based on the uninstall the filtering agent and prevent a conflict between a subsequent build job and the access privileges of the first list and the second list.

14. The non-transitory machine-readable storage medium of claim 13, further comprising executable instructions that, when executed by the processing device, cause the processing device to:

responsive to determining that the access privileges of the first list conflict with the access privileges of the second list, generate a third list based on a priority of at least one of the first list or the second list.

15. The non-transitory machine-readable storage medium of claim 13, wherein the first list is identified using at least one of a regular expression, an identifier, or an attribute associated with the software build job.

16. The non-transitory machine-readable storage medium of claim 13, wherein the first list specifies one or more communication protocols the software build job is prohibited from using.

17. The non-transitory machine-readable storage medium of claim 13, wherein the first list comprises one or more communication protocols the software build job is allowed to use.

* * * * *